(12) United States Patent
Lasserre et al.

(10) Patent No.: US 11,830,210 B2
(45) Date of Patent: Nov. 28, 2023

(54) METHOD AND DEVICE FOR GENERATING POINTS OF A 3D SCENE

(71) Applicant: InterDigital VC Holdings, Inc., Wilmington, DE (US)

(72) Inventors: Sebastien Lasserre, Thorigné Fouillard (FR); Julien Ricard, Cesson-Sevigne (FR); Remi Jullian, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 120 days.

(21) Appl. No.: 16/753,787

(22) PCT Filed: Oct. 3, 2018

(86) PCT No.: PCT/US2018/054057
§ 371 (c)(1),
(2) Date: Apr. 5, 2020

(87) PCT Pub. No.: WO2019/070778
PCT Pub. Date: Apr. 11, 2019

(65) Prior Publication Data
US 2020/0258247 A1 Aug. 13, 2020

(30) Foreign Application Priority Data
Oct. 6, 2017 (EP) .................................... 17306345

(51) Int. Cl.
*G06T 15/20* (2011.01)
*G06T 17/00* (2006.01)
*G06T 7/529* (2017.01)

(52) U.S. Cl.
CPC ............ *G06T 7/529* (2017.01); *G06T 15/205* (2013.01); *G06T 17/00* (2013.01); *G06T 2207/10028* (2013.01)

(58) Field of Classification Search
None
See application file for complete search history.

(56) References Cited

U.S. PATENT DOCUMENTS 8,013,873 B2    9/2011  Barenbrug et al.
9,645,240 B1 *  5/2017  Ossig ..................... G01S 7/003
(Continued)

FOREIGN PATENT DOCUMENTS

CN    102055982 A     5/2011
CN    104981849 A    10/2015
(Continued)

OTHER PUBLICATIONS

Anonymous, "Advanced Video Coding for Generic Audiovisual Services". International Telecommunication Union, Series H: Audiovisual and Multimedia System, Infrastructure of audiovisual services—Coding of moving video, ITU-T Recommendation H.264, Mar. 2010, 676 pages.
(Continued)

*Primary Examiner* — Anh-Tuan V Nguyen
(74) *Attorney, Agent, or Firm* — CONDO ROCCIA KOPTIW LLP

(57) ABSTRACT

A method and device for generating points of a 3D scene from a depth image. To reach that aim, depth information associated with a current pixel is compared with depth information associated with pixels spatially adjacent to the current pixel in the depth image. When the difference of depth between the current pixel and an adjacent pixel is greater than a first value and less than a second value, at least an additional point of said 3D scene is generated, in addition to a current point associated with the current pixel of the depth image, the number of additional points depending on the depth difference.

17 Claims, 7 Drawing Sheets

(56) References Cited

U.S. PATENT DOCUMENTS

| | | | |
|---|---|---|---|
| 2006/0066611 A1* | 3/2006 | Fujiwara | G06T 15/06 345/419 |
| 2008/0192067 A1 | 8/2008 | Barenbrug et al. | |
| 2009/0174710 A1 | 7/2009 | Sim et al. | |
| 2010/0034457 A1* | 2/2010 | Berliner | G06T 7/246 382/154 |
| 2012/0141016 A1* | 6/2012 | Wildeboer | H04N 13/271 382/154 |
| 2012/0162395 A1* | 6/2012 | Ho | H04N 13/111 348/51 |
| 2013/0106837 A1* | 5/2013 | Mukherjee | H04N 13/122 345/419 |
| 2013/0138404 A1* | 5/2013 | Carbonera | G06T 17/205 703/2 |
| 2013/0194255 A1* | 8/2013 | Lee | H04N 19/597 345/419 |
| 2013/0202193 A1* | 8/2013 | Rahmes | G06T 17/00 382/154 |
| 2014/0132733 A1* | 5/2014 | Mundhenk | G06T 5/002 382/284 |
| 2015/0130804 A1* | 5/2015 | Hatanaka | G06T 19/20 345/419 |
| 2015/0172717 A1* | 6/2015 | Zhao | H04N 19/597 375/240.16 |
| 2015/0228114 A1* | 8/2015 | Shapira | G06T 15/04 345/421 |
| 2016/0005213 A1 | 1/2016 | Lecocq et al. | |
| 2016/0063754 A1* | 3/2016 | Korchev | G06T 7/11 345/424 |
| 2017/0116497 A1* | 4/2017 | Georgescu | G16H 50/70 |
| 2017/0116781 A1* | 4/2017 | Babahajiani | G06T 17/20 |
| 2017/0139046 A1* | 5/2017 | Ossig | G01S 17/89 |
| 2017/0186223 A1* | 6/2017 | Lerner | G06T 7/0002 |
| 2017/0323471 A1* | 11/2017 | Chien | G06T 15/60 |
| 2017/0344807 A1* | 11/2017 | Jillela | G06K 9/00288 |
| 2017/0371348 A1* | 12/2017 | Mou | G01S 17/89 |
| 2018/0096463 A1* | 4/2018 | Kim | G06T 17/20 |
| 2018/0101932 A1* | 4/2018 | Kwon | G06T 3/0068 |
| 2018/0218510 A1* | 8/2018 | Taguchi | G06T 7/337 |
| 2018/0253909 A1* | 9/2018 | Chen | G06T 7/344 |
| 2018/0350044 A1* | 12/2018 | Ponto | G06T 5/007 |
| 2019/0110040 A1* | 4/2019 | Doyen | H04N 13/268 |
| 2020/0050839 A1* | 2/2020 | Wolf | B25J 9/1697 |

FOREIGN PATENT DOCUMENTS

| | | |
|---|---|---|
| RU | 2407224 C2 | 12/2010 |
| RU | 20080192067 | 12/2010 |

OTHER PUBLICATIONS

Curless et al., "A Volmumetric Method for Building Complex Models from Range Images", SIGGRAPH '96: Proceedings of the 23rd Annual Conference on Computer Graphics and Interactive Techniques, Aug. 1996, pp. 303-312.

Berger et al., "State of the Art in Surface Reconstruction from Point Clouds", Eurographics 2014—State of the Art Reports, Apr. 2014, pp. 161-185.

Stavrou et al., "3D Object Repair Using 2D Algorithms", International Conference on Computational Science (ICCS 2006), Reading, United Kingdom, May 28, 2006, pp. 271-278.

Doria et al., "Filling Large Holes in LIDAR Data by Inpainting Depth Gradients", 2012 IEEE Computer Society Conference on Computer Vision and Pattern Recognition Workshops, Providence, Rhode Island, USA, Jun. 16, 2012, pp. 65-72.

Suzuki et al., "Integration of multiple view plus depth data for free viewpoint 3D display", Proceedings of the SPIE—IS&T Electronic Imaging, vol. 9011, Mar. 2014, 10 pages.

Tarbox et al., "IVIS: An Integrated Volumetric Inspection System", IEEE 2nd CAD-Based Vision Workshop, Champion, Pennsylvania, USA, Feb. 8, 1994, pp. 220-227.

Anonymous, Information Technology—Digital Compression and Coding of Continuous-Tone Still Images—Requirements and Guidelines, Technical Corrigendum 1: Patent Information Update, International Telecommunication Union, ITU-T Telecommunication Standardization Sector of ITU, Recommendation T.81, Corrigendum 1, Jan. 2004, 12 pages.

Huang et al., "Edge-aware Depth Completion for Point-cloud 3D Scene Visualization on an RGB-D Camera", 2014 IEEE Visual Communications and Image Processing Conference (VCIP), Valletta, Malta, Dec. 7, 2014, pp. 422-425.

Ricard et al., "CGI-based dynamic point cloud test content", International Organization for Standardization, ISO/ IEC JTC1/SC29/WG11, Coding of Moving Pictures and Audio, Document ISO/IEC JTC1/SC29/WG11 MPEG2017/m40050, Geneva, Switzerland, Jan. 2017, 4 pages.

Xiao et al., "Reconstructing the World's Museums", 12th European Conference on Computer Vision, Firenze, Italy, Oct. 7, 2012, 14 pages.

Wei et al., "Dense and Occlusion-Robust Multi-View Stereo for Unstructured Videos", 2016 13th Conference on Computer and Robot Vision (CRV), Victoria, British Columbia, Canada, Jun. 1, 2016, pp. 69-76.

Anonymous, "High Efficiency Video Coding", Series H: Audiovisual and Multimedia Systems, Infrastructure of Audiovisual Services—Coding of Moving Video, Recommendation ITU-T H.265 Standard, Telecommunication Standardization Sector of ITU, Dec. 2016, pp. 1-664.

Kim et al., "High-Quality Depth Map Up-Sampling Robust to Edge Noise of Range Sensors", 19th IEEE International Conference on Image Processing (ICIP), Orlando, Florida, USA, Sep. 30, 2012, pp. 553-556.

PatDocs English Language Translation, CN 102055982 A, 30 pages.

* cited by examiner

METHOD AND DEVICE FOR GENERATING POINTS OF A 3D SCENE

CROSS REFERENCE TO RELATED APPLICATIONS

This application is the national stage entry under 35 U.S.C. § 371 of International Application PCT/US2018/054057, filed Oct. 3, 2018 which was published in accordance with PCT Article 21(2) on Apr. 11, 2019, in English, and which claims the benefit of European Patent Application No. 17306345.4, filed Oct. 6, 2017.

TECHNICAL FIELD

The present document relates to the domain of processing a 3D scene. Particularly, but not exclusively, the technical field of the present principles is related to the processing of points of a point cloud representing the geometry and/or texture of the 3D scene or part of it, e.g. the geometry and/or texture of a 3D object. The technical field of the present principles may also relate to encoding/decoding of 3D image data that uses a texture and depth projection scheme.

BACKGROUND

This section is intended to introduce the reader to various aspects of art, which may be related to various aspects of the present document that are described and/or claimed below. This discussion is believed to be helpful in providing the reader with background information to facilitate a better understanding of the various aspects of the present invention. Accordingly, these statements are to be read in this light, and not as admissions of prior art.

It is well-known to represent a 3D object with a point cloud or a mesh.

A mesh comprises mesh elements (e.g. triangles) that are each represented with vertices and edges connecting the vertices. A mesh is usually intended to represent the external surface of the 3D object.

A point cloud is a set of points usually intended to represent the external surface of the 3D object but also more complex geometries like hair, fur that may not be represented efficiently by other data format like meshes. Each point of a point cloud is often defined by a 3D spatial location (X, Y, and Z coordinates in the 3D space) and possibly by other associated attributes such as a color, represented in the RGB or YUV color space for example, a transparency, a reflectance, a two-component normal vector, etc. A colored point cloud might be considered, i.e. a set of 6-component points (X, Y, Z, R, G, B) or equivalently (X, Y, Z, Y, U, V) where (X, Y, Z) defines the spatial location of a point in a 3D space and (R, G, B) or (Y, U, V) defines a color or texture of this point.

A point cloud may be represented with texture and depth projections, corresponding to an image-based point cloud representation.

Following depth compression, some points of the 3D scene may be erroneously reconstructed or simply missing, leading to holes in the 3D scene that may be visible according to the point of view.

SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present document relates to a method of generating points of a 3D scene from a depth image, the method comprising:
  for a current pixel of the depth image, comparing depth information associated with the current pixel with depth information associated with pixels spatially adjacent to the current pixel in the depth image;
  when the difference of depth between the current pixel and an adjacent pixel is greater than a first value and less than a second value, generating at least an additional point of the 3D scene in addition to a current point associated with the current pixel of the depth image, the number of additional points depending on the difference.

The present document also relates to a device/apparatus adapted to generate points of a 3D scene from a depth image, the device/apparatus comprising a memory associated with at least a processor configured to:
  for a current pixel of the depth image, compare depth information associated with the current pixel with depth information associated with pixels spatially adjacent to the current pixel in the depth image;
  when the difference of depth between the current pixel and an adjacent pixel is greater than a first value and less than a second value, generate at least an additional point of the 3D scene in addition to a current point associated with the current pixel of the depth image, the number of additional points depending on the difference.

The present document also relates to a device/apparatus adapted to generate points of a 3D scene from a depth image, the device/apparatus comprising:
  means for comparing, for a current pixel of the depth image, depth information associated with the current pixel with depth information associated with pixels spatially adjacent to the current pixel in the depth image;
  means for generating at least an additional point of the 3D scene in addition to a current point associated with the current pixel of the depth image when the difference of depth between the current pixel and an adjacent pixel is greater than a first value and less than a second value, the number of additional points depending on the difference.

According to a characteristic, the adjacent pixel having the greatest depth difference with the current pixel is selected among the adjacent pixels having a depth difference with the current pixel comprised between the first value and the second value, the number of generated additional points depending from the greatest depth difference.

According to a specific characteristic, a volume unit being associated with a point of the 3D scene, the depth difference corresponding to a number of volume unit, the number of generated points corresponding to the depth difference minus 1.

According to another characteristic, attributes to be associated with the at least one additional point are determined, the attributes being determined from attributes associated with the current point and with the adjacent pixel.

According to a further characteristic, the attributes to be associated with the at least one additional point comprise depth information and/or texture information.

According to a further characteristic, the depth image is decoded from a received bitstream.

According to another characteristic, the points of the 3D scene are part of a point cloud.

The present document also relates to a computer program product comprising instructions of program code for executing, by at least one processor, the abovementioned method of generating points of a 3D scene from a depth image, when the program is executed on a computer.

The present document also relates to a (non-transitory) processor readable medium having stored therein instructions for causing a processor to perform at least the abovementioned method of generating points of a 3D scene from a depth image.

LIST OF FIGURES

The present document will be better understood, and other specific features and advantages will emerge upon reading the following description, the description making reference to the annexed drawings wherein.

Figure 1:
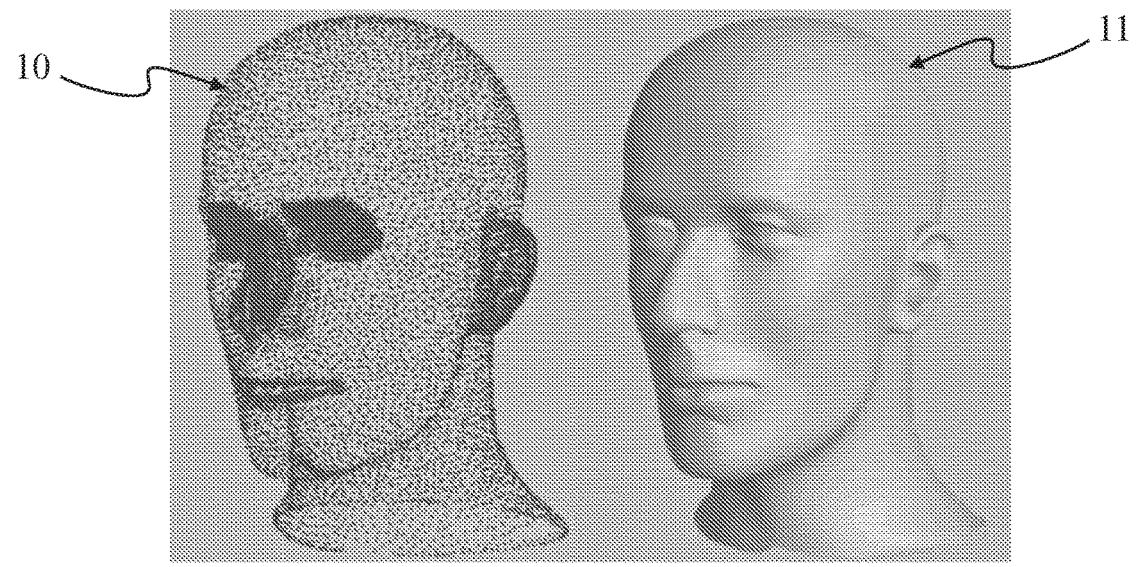
FIG. 1 shows an example of a 3D object of a 3D scene, in accordance with an example of the present principles.
Figure 6A:
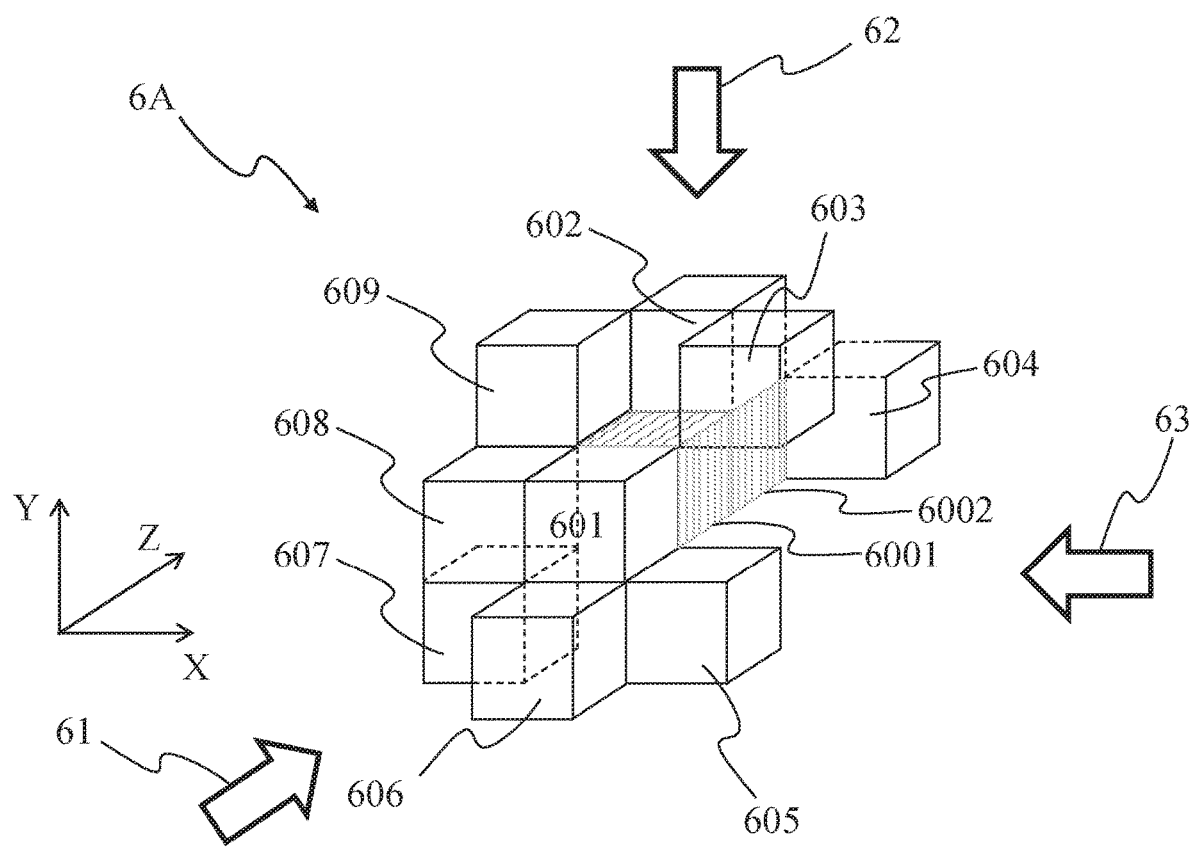
FIGS. 6A and 6B show a 3D representation of some points of the 3D object of FIG. 1 and associated depth image, in accordance with a non-limiting embodiment of the present principles.
Figure 7A:
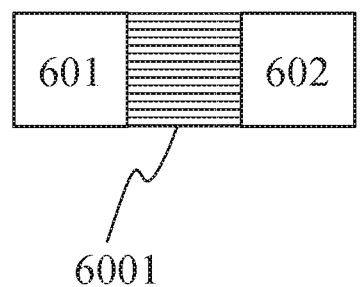
Figure 7B:
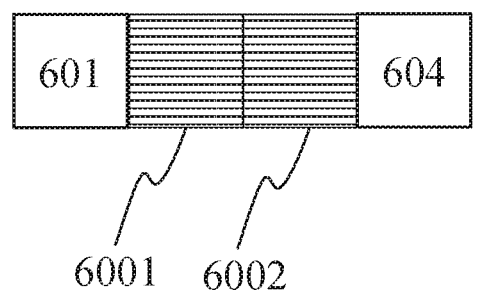
Figure 8:
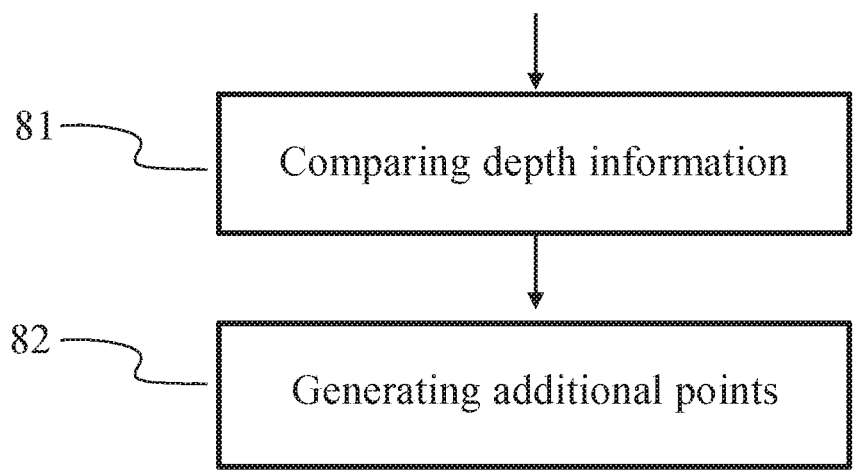
Figure 9:
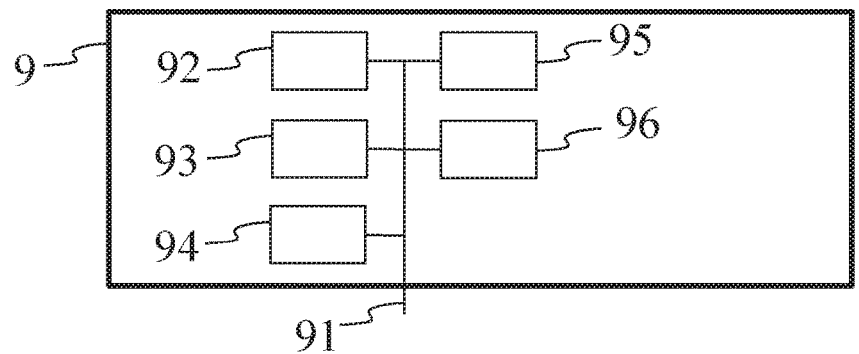
Figure 10:
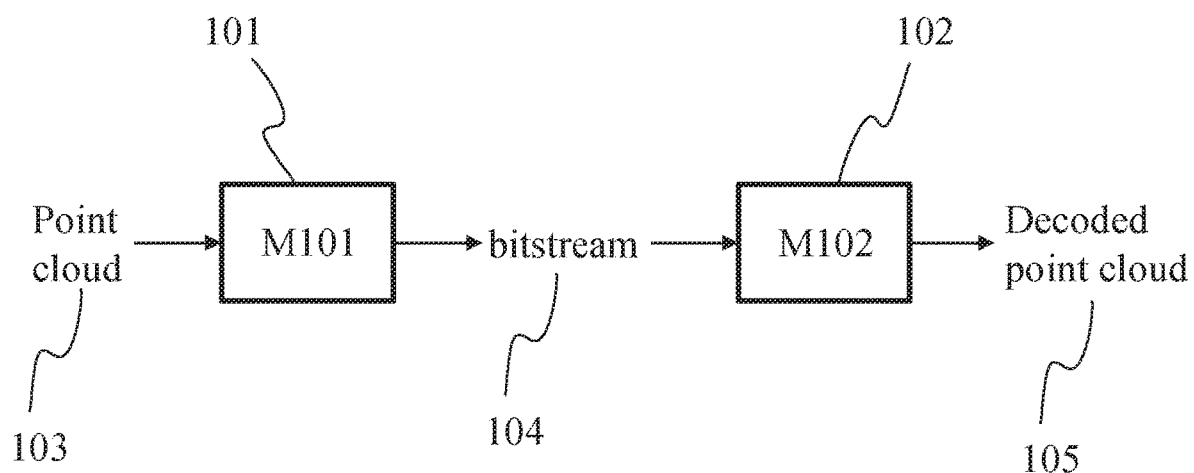
Figure 11:
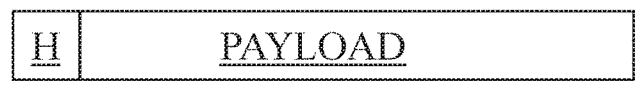
Figure 12:
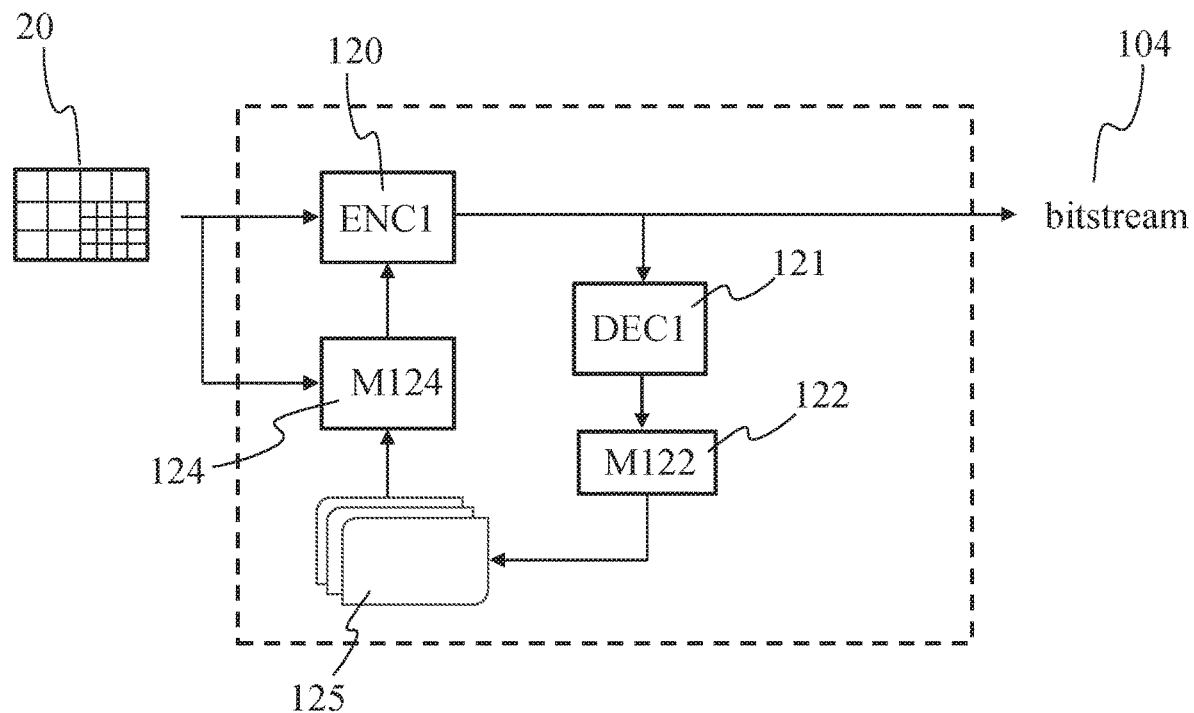
Figure 13:
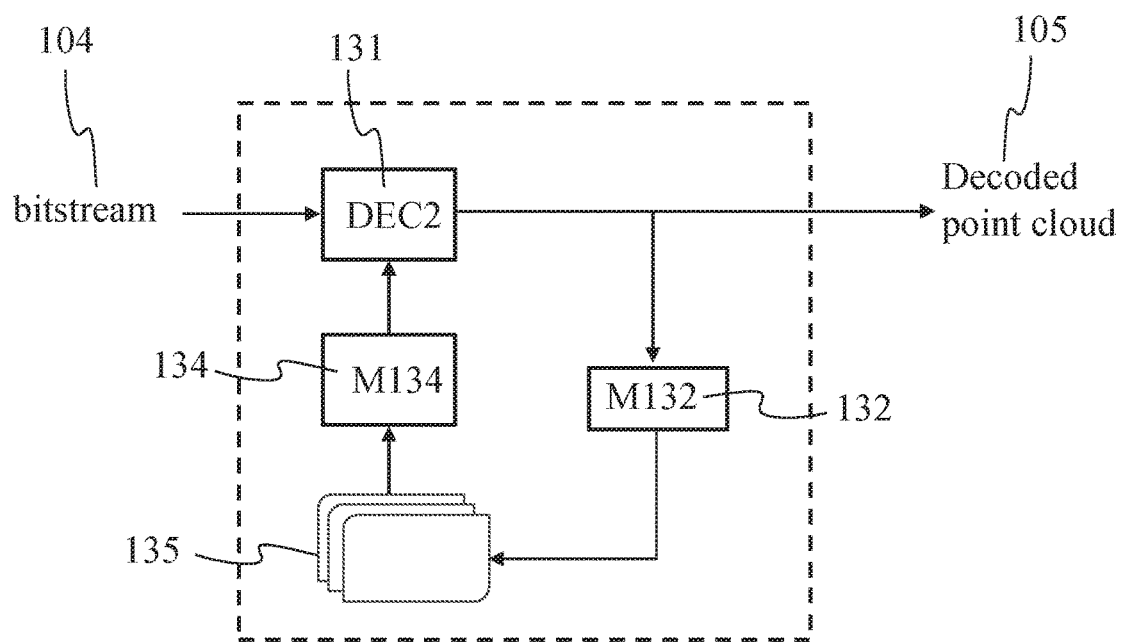

FIGS. 7A and 7B each shows a 2D representation of holes comprised in the 3D representation of FIG. 6A, in accordance with a non-limiting embodiment of the present principles;

FIG. 8 shows a method for generating one or more points of the 3D scene of FIG. 1, in accordance with a non-limiting embodiment of the present principles;

FIG. 9 shows an example of an architecture of an apparatus for implementing the method of FIGS. 8, 12 and/or 13, in accordance with a non-limiting embodiment of the present principles;

FIG. 10 shows an example of an encoding/decoding scheme of a point cloud representing the 3D object of FIG. 1, in accordance with an example of the present principles;

FIG. 11 shows an example of a syntax of a signal transporting a bitstream obtained by the scheme of FIG. 10, in accordance with a non-limiting embodiment of the present principles;

FIG. 12 shows an example of a process implemented in the encoding of a point cloud representing the 3D object of FIG. 1, in accordance with a non-limiting embodiment of the present principles; and FIG. 13 shows an example of a process for decoding a bitstream to obtain the decoded point cloud representing the 3D object of FIG. 1 object of FIG. 1, in accordance with a non-limiting embodiment of the present principles.

DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

According to non-(imitative embodiments, a method and a device to generate points of a three-dimensional (3D) scene are disclosed.

In the following, an image contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

In the following, a picture may be seen as an image, i.e. an array of samples, or as a collection of images.

A pixel value is represented by a vector of nv values, where nv is the number of components. Each value of a vector is represented with a number of bits which defines a maximal dynamic range of the pixel values.

The present principles will be described in reference to a particular embodiment of a method for (and an apparatus configured for) generating one or more points of a 3D scene, e.g, one or more points of a 3D object of the 3D scene in addition to existing points. Attributes may be associated with the existing points of the 3D scene, the attributes corresponding to texture information (texture attributes) and/or depth information (depth attributes). The depth (or distance) attributes are stored in a depth image, i.e. associated with the pixels of the depth image, and the texture (or color) attributes are stored in a texture image, i.e. associated with the pixels of the texture image. The depth information associated with a current pixel of the depth image is compared with the depth information associated with pixels of the depth image that are adjacent to the current pixel. The current pixel with its adjacent pixels form a block of 9 pixels with 8 adjacent pixels surrounding the current pixel. This block of 9 pixels is associated with a set of 9 points of the 3D scene, the 8 points associated with the 8 adjacent pixels forming a neighborhood of the current point associated with the current pixel. For at least one of the adjacent pixel having a depth difference with regard to the current pixel that is less than a first value and greater than a second value, one or more additional points of the 3D scene are generated in addition to the current point associated with the current pixel of the depth map. The number of additional point(s) that is(are) generated depend on the depth difference, the greater the depth difference, the greater the number of generated additional points.

The neighborhood of a point of the 3D scene in the depth image (respectively texture image) corresponds to the pixels of the depth image (respectively texture image) located in the neighborhood of the pixel of the depth image (respectively texture image), the latter pixel corresponding to said point of the 3D object. The neighborhood of a pixel may for example encompass all the pixels adjacent to said pixel without being limited to such an example. For example, the neighborhood may encompass the pixels adjacent to said pixel and all pixels adjacent to each pixel adjacent to said pixel, or even more.

Generating additional points of the 3D scene enable to fill holes in the 3D scene that may be visible when changing the point of view. It may also enable to increase the density of points in some areas of the 3D scene. The use of the depth image (instead of the 3D space of the 3D object) enables to quickly identify the holes to be filled.

Even if described with reference to a single depth image of the 3D scene, the present principles apply in a same way to a plurality of depth images.

FIG. 1 shows two different representations of a 3D object, or part of it, according to a non-limiting embodiment. The 3D object may for example belong to a 3D scene comprising one or more 3D objects, According to the example of FIG. 1, the object is a person, for example moving within the scene, and a part of the object corresponding to the head is illustrated in FIG. 1. FIG. 1 may also illustrate a three-dimension (3D) model of an object 10 and a points of a point cloud 11 corresponding to 3D model 10. Model 10 may be a 3D mesh representation and points of point cloud 11 may be the vertices of the mesh. Points 11 may also be points spread on the surface of faces of the mesh. Model 10 may also be represented as a splatted version of point of cloud 11, the surface of model 10 being created by splatting the point of point of cloud 11. Model 10 may be represented by a lot of different representations such as voxels or splines. FIG. 1 illustrates the fact that it is always possible to define a point cloud from a surface representation of a 3D object and reciprocally always possible to create a surface representation of a 3D object from a point of cloud. As used herein, projecting points of a 3D object (by extension points of a 3D scene) to an image is equivalent to projecting any representation of this 3D object to an object.

A first representation 10 of the part of the object is a point cloud. The point cloud corresponds to a large collection of points representing the object, e.g. the external surface or the external shape of the object. A point cloud may be seen as a vector based structure, wherein each point has its coordinates (e.g. three-dimensional coordinates XYZ, or a depth/distance from a given point of view) and one or more attributes, also called component. An example of component is the color component that may be expressed in different color spaces, for example RGB (Red, Green and Blue) or YUV (Y being the luma component and UV two chrominance components). The point cloud is a representation of the object as seen from a given point of view, or a range of point of views. The point cloud may be obtained of different ways, e.g.:
  from a capture of a real object shot by a rig of cameras, optionally complemented by depth active sensing device;
  from a capture of a virtual/synthetic object shot by a rig of virtual cameras in a modelling tool;
  from a mix of both real and virtual objects.

In the first case (from the capture of a real object), the set of cameras generates a set of images or sequences of images (videos) corresponding to the different views (different points of view). The depth information—meaning the distance from each camera center to the object surface—is obtained either by means of active depth sensing device, e.g., in infrared range and based on structured light analysis or time of flight, or based on disparity algorithms. In both cases, all cameras need to be calibrated, intrinsically and extrinsically. The disparity algorithms consist on a search of similar visual features on a pair of rectified camera images, typically to be made along a 1-dimension line: the larger the pixel column difference, the closer the surface of this feature. In the case of a camera array, the global depth information may be obtained from the combining of a plurality of peer disparity information, taking benefit of the plurality of camera pairs, therefore improving the signal over noise ratio.

In the second case (synthetic object), the modelling tool provides directly the depth information.

The point cloud 10 may be a dynamic point cloud that evolves with the time, i.e. the number of points may vary with the time and/or the location (e.g. at least one of the coordinates X, Y and Z) of one or more points may vary with the time. The evolution of the point cloud may correspond to the motion of the object represented by the point cloud and/or to any change of shape of the object or part(s) of the object.

The point cloud 10 may be represented in a picture or in one or more groups of temporally successive pictures, each picture comprising a representation of the point cloud at a determined time 't'. The one or more groups of temporally successive pictures may form a video representative of at least a part of the point cloud 10.

A second representation 11 of the part of the object may be obtained from the point cloud representation 10, the second representation corresponding to a surface representation. The point cloud may be processed in order to compute its surface. For that purpose, for a given point of the point cloud, the neighboring points of this given point are used in order to compute the normal to the local surface at this given point, the surface element associated with this given point being derived from the normal. The process is reiterated for all points to obtain the surface. Methods for reconstructing the surface from a point cloud are for example described by Matthew Berger et al. in "*State of the Art in Surface Reconstruction from Point Clouds*", State of the Art Report, 2014. According to a variant, the surface element associated with a given point of the point cloud is obtained by applying splat rendering to this given point. The surface of the object (also called implicit surface or external surface of the object) is obtained by blending all the splats (e.g., ellipsoids) associated with the points of the point cloud.

In a particular embodiment, the point cloud represents only partial views of the object, and not the object in its totality, and this corresponds to the way how the object is supposed to be watched at the rendering side, for example in a cinematographic scene. For example, the shooting of a character facing a flat camera array generates a point cloud on the side of the rig only. The back of the character does not even exist, the object is not closed on itself, and the geometric characteristics of this object is therefore the set of all the surfaces oriented in the direction of the rig (the angle between the normal of each local surface and the ray back to the acquisition device is for example less than 90°).

Figure 2A:
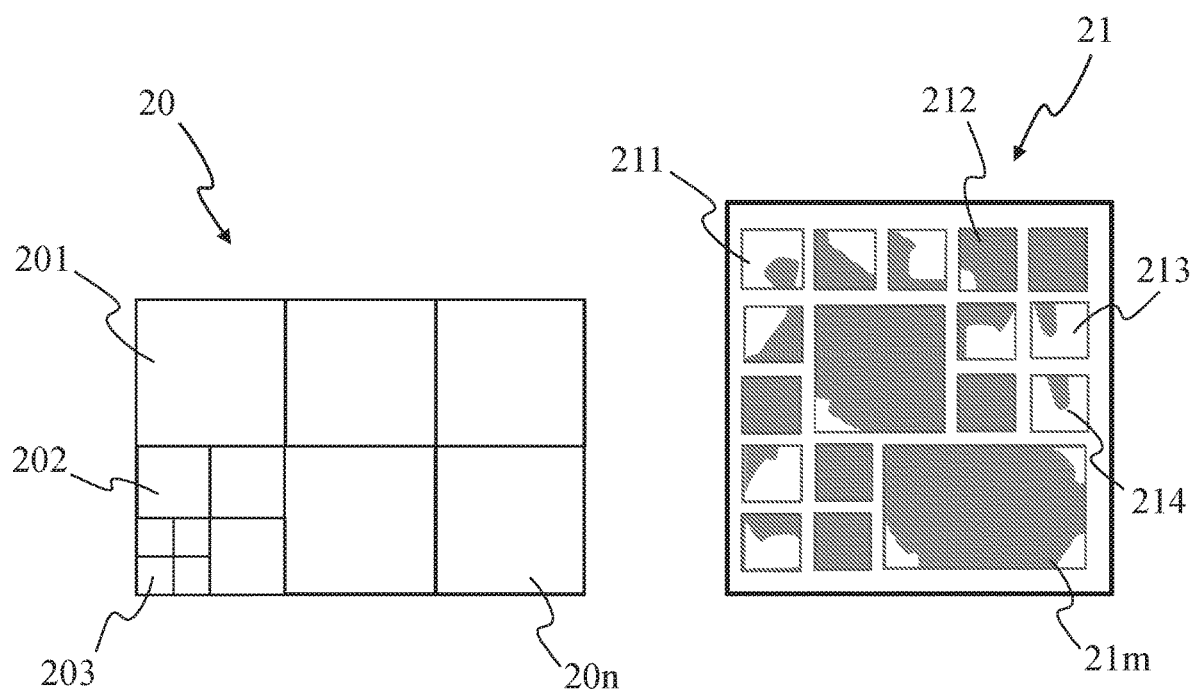
FIGS. 2A and 2B shows examples of attributes image associated with the 3D object of FIG. 1, in accordance with a non-limiting embodiment of the present principles.
Figure 2B:
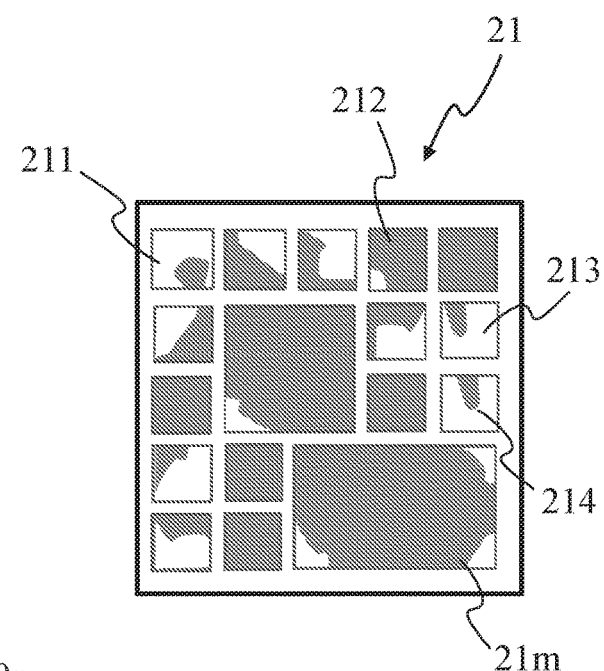

FIGS. 2A and 2B each shows a picture of the point cloud 10, according to specific non-limiting embodiments of the present principles.

FIG. 2A illustrates a first example of a picture 20 of the point cloud, for example a picture of a GOP (Group of Pictures) of the point cloud. The picture 20 is composed of a set of n images 201, 202, 203, 20n, n being an integer greater than or equal to 2. Each of the image 201 to 20n corresponds to an array of pixels, the size and/or the definition of which may vary from an image to another image. For example, the definition of the images 201 and 20n is the same while the definitions of images 202, 203 are different from each other and from the definition of the images 201 and 20n. In the example of FIG. 2A, the images 201 to 20n are spatially arranged to cover the whole picture 20 without overlap between the images. According to a variant, the images 201 to 20n do not cover the whole picture, a space existing between the images 201 to 202, or between at least some of them, i.e. the edges of two adjacent images may not be in contact. Data may be associated with each pixel of the images 201 to 20n, for example texture information and/or depth information. The texture information may for example be stored under the form of grey levels associated with each channel of a color space (e.g. RGB color space or YUV color space), the grey level for each channel being for example expressed with a first determined number of bits, e.g. 8, 10 or 12 bits. The depth information may for example be stored under the form of a value, for example in the a channel with a second determined number of bits, e.g. 8, 10 or 12 bits. Thus, four components RGBα or YUVα (e.g. four 10-bit channels) may for example be associated with each pixel in the picture 20 to represent the point cloud at a determined time 't'. According to a variant, a first picture 20 is used to store the texture information (e.g. 3 components RGB or YUV) and a second picture with the same arrangement of images is used to store the depth information, both pictures representing the point cloud at time 't'. The set of images forming the picture 20 may for example be obtained by projecting points of the point cloud according to projection(s), e.g. a different projection per first image, as illustrated on FIG. 3.

Figure 3:
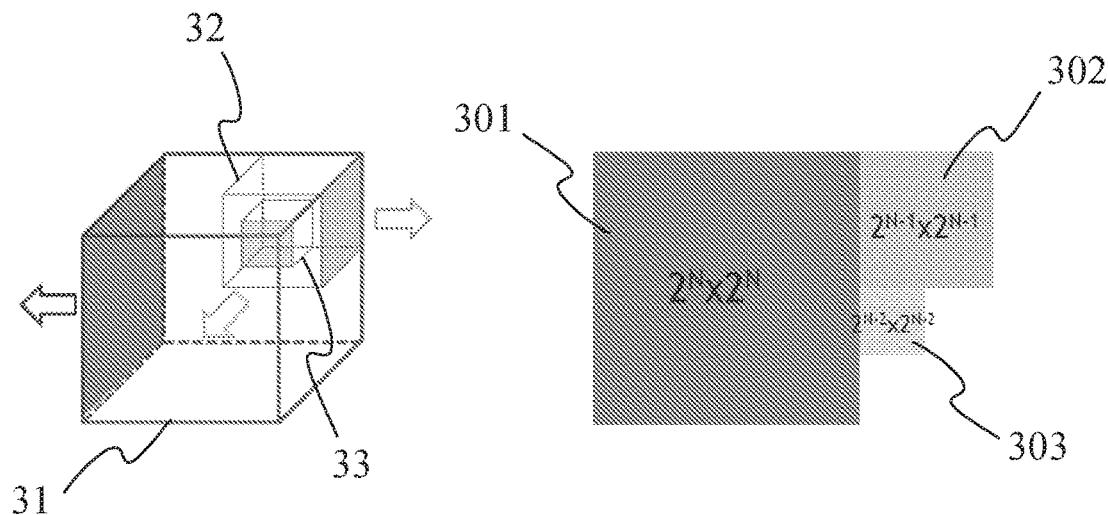
FIG. 3 shows a first example for obtaining the attributes image of FIGS. 2A and 2B, in accordance with a non-limiting embodiment of the present principles.

FIG. 3 illustrates a cube 31 bounding at least a part of the point cloud 10, according to a non-limiting example of the present principles.

The cube 31 is for example subdivided into 8 sub-cubes (only one sub-cube 32 of the 8 sub-cubes being shown for clarity purpose) at a first subdivision level. The sub-cube 32 is also subdivided into 8 sub-cubes (only one sub-cube 33 of the 8 sub-cubes being shown for clarity purpose) at a second subdivision level. At each subdivision level, a part of the points of the point cloud may be projected (e.g. according to an orthogonal projection) onto one or more faces of the cube(s) (e.g. the faces with grey filling). For example, points of the point cloud are projected onto the face 301 of the cube 31, onto the face 302 of the cube 32 and onto the face 303 of the cube 33. The faces are for example discretized to form arrays of pixels with definitions/sizes that depend on the subdivision level of the cube. For example, for a pixel of a face of a cube, the point of the point cloud that is projected onto said pixel corresponds to the point of the point cloud that is the closest from said pixel when tracing a ray from said pixel and orthogonal to the face comprising said pixel. The attributes associated with said pixel correspond to the attributes (texture and/or depth) of the point projected onto said pixel.

The face 301 is for example used to form the image 201, the face 302 to form the image 302 and the face 303 to form the image 303.

FIG. 2B illustrates a second example of a picture 21 of the point cloud, for example a picture of a GOP of the point cloud. The picture 21 is composed of a set of m images 211, 212, 213, 214, 21m, m being an integer greater than or equal to 2. The arrangement of the images 211 to 21m may be different from the one of picture 20 with for example free space between the images 211 to 21m. The images 211 to 21m may have varied sizes and/or definitions. Each picture may receive attributes from the points of the point cloud, said attributes being associated with at least some of the pixels of each image 211 to 21m. For example, the part of each image that receives attributes from the point cloud is shown as a grey area while the part of the image that does not receive attributes from the point cloud is shown as a white area, said white area may be filled with default value, like the free space between images. Just like for the picture 20 of FIG. 2A, the data associated with the pixels of the images 211 to 21n may correspond to texture information and/or depth information. In a variant, a first picture 21 is used to store the texture information (e.g. 3 components RGB or YUV) and a second picture 21 with the same arrangement of images 211 to 21m is used to store the depth information, both pictures representing the point cloud at time 't'.

The set of images forming the picture 21 may for example comprise one or more first images and potentially one or more second images. The first image(s) (at least the grey area of each first image) may for example be obtained by projecting points of the point cloud according to first projection(s), e.g. a different first projection per first image, as illustrated on FIG. 4.

Figure 4:
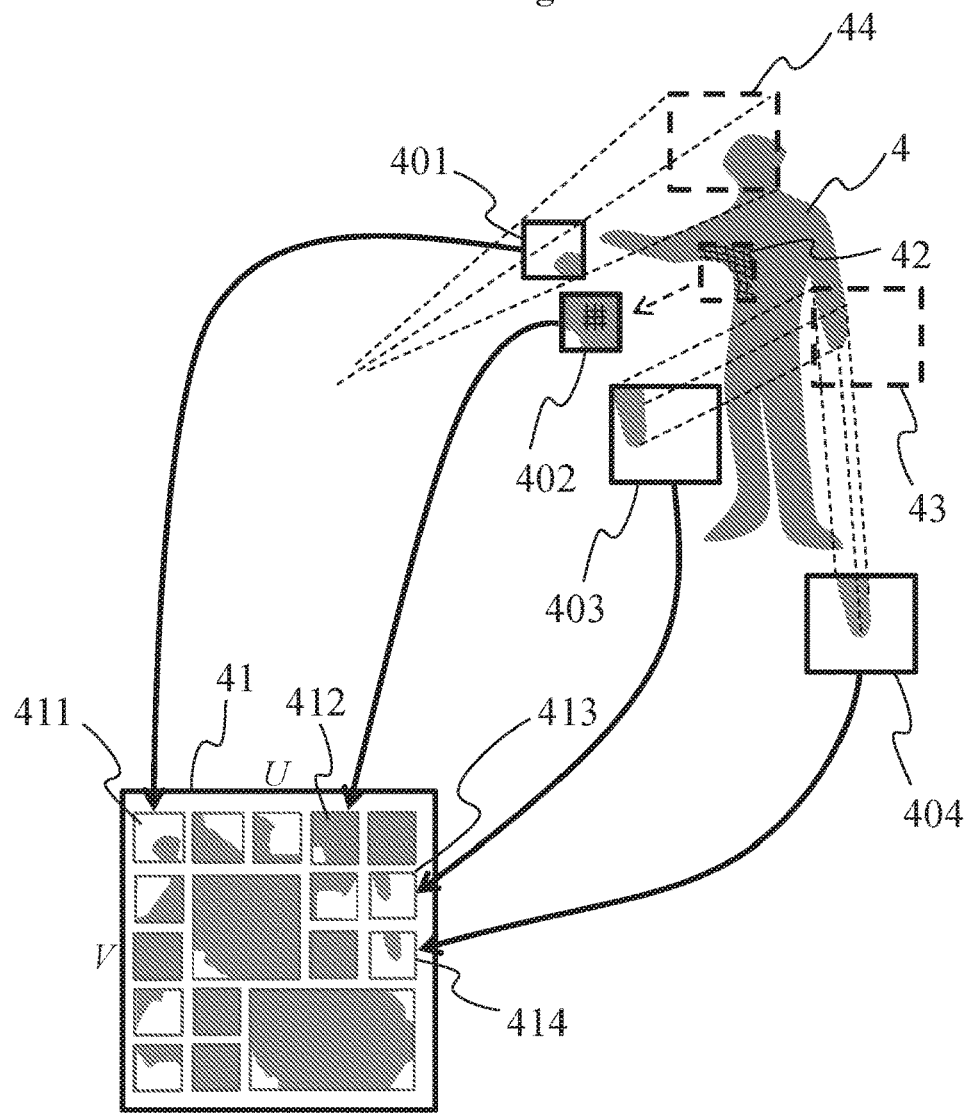
FIG. 4 shows a second example for obtaining the attributes image of FIGS. 2A and 2B, in accordance with a non-limiting embodiment of the present principles.

FIG. 4 illustrates the obtaining of the first images of the set of images forming the picture 21, according to a non-limiting example of the present principles. The point cloud representing the 3D object 4 is partitioned into a plurality of 3D parts, e.g. 50, 100, 1000 or more 3D parts, 3 of them being illustrated on FIG. 4, i.e. the 3D parts 42, 43 and 44, the 3D part 44 comprising points of the point cloud representing part of the head of the person (corresponding for example to the point cloud 10 of FIG. 1), the 3D part 42 comprising points of the point cloud representing an armpit of the person and the 3D part 43 comprising points of the point cloud representing a hand of the person. One or more images of each 3D part or of a part of the 3D parts are generated to represent each 3D part in two dimensions, i.e. according to a 2D parametrization. For example, a 2D parametrization 401 is obtained for the 3D part 44, a 2D parametrization 402 is obtained for the 3D part 42 and 2 different 2D parametrizations 403 and 404 are obtained for the 3D part 43. The 2D parametrization may vary from a 3D part to another one. For example, the 2D parametrization 401 associated with the 3D part 41 is a linear perspective projection while the 2D parametrization 402 associated with the 3D part 42 is a LLE and the 2D parametrizations 403 and 404 associated with the 3D part 43 are both orthographic projections according to different points of view. According to a variant, all 2D parametrizations associated with all 3D parts are of the same type, e.g. a linear perspective projection or an orthographic projection. According to a variant, different 2D parametrizations may be used for a same 3D part.

A 2D parametrization associated with one given 3D part of the point cloud corresponds to a browsing in 2 dimensions of the given 3D part of the point cloud allowing to sample the given 3D part, i.e. a 2D representation of the content (i.e. the point(s)) of this given 3D part comprising a plurality of samples (that may correspond to the pixels of a first image), the number of which depending from the sampling step that is applied. A 2D parametrization may be obtained in diverse ways, for example by implementing any one of the following methods:

- linear perspective projection of the points of the 3D part of the point cloud onto a plane associated with a point of view, the parameters representative of the linear perspective projection comprising the location of the virtual camera, the spatial sampling step and the field of view in the 2 dimensions;
- orthographic projection of the points of the 3D part of the point cloud onto a surface, the parameters representative of the orthographic projection comprising the geometry (shape, size and orientation) of the projecting surface and spatial sampling step;
- LLE (Locally-Linear Embedding) that corresponds to a mathematical operation of dimension reduction, here applied to convert/transform from 3D to 2D, the parameters representative of the LLE comprising the transformation coefficients.

Each image has advantageously a rectangular shape to ease the packing process on the picture 21.

Figure 5A:
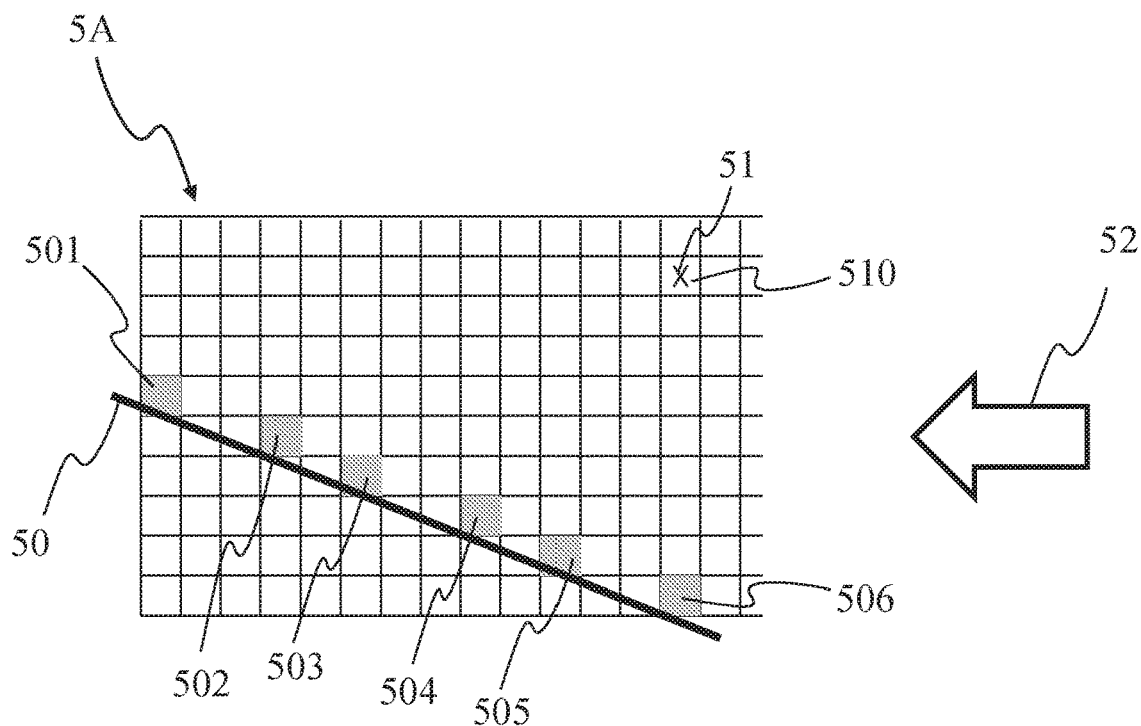
FIGS. 5A and 5B show points of the 3D object of FIG. 1 according to a determined point of view, in accordance with a non-limiting embodiment of the present principles.
Figure 5B:
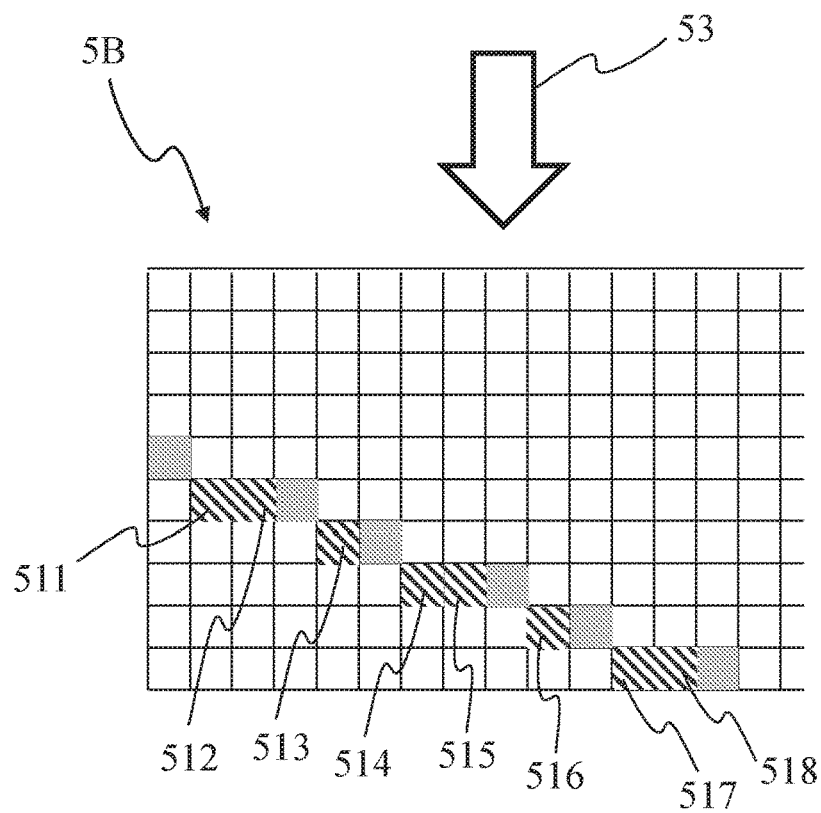

FIGS. 5A and 5B show a 2D representation of a part of the 3D scene of FIG. 1, according to a non-limiting example of the present principles.

FIG. 5A provides an example of a 2D representation 5A of a part of the 3D object 10, for example a cross section of the 3D object 10. The points of the cross section 5A are represented with a square that corresponds to a cube or a voxel in the 3D representation 10. For example, the square (or cube) 510 is represented with the point 51. Cubes or voxels are associated with the points of the 3D scene (or of the point cloud when the 3D scene is represented with a point cloud) to fill the space of the 3D scene. Some of the squares represented on FIG. 5A may be empty, i.e. there is no point of the 3D scene associated with them, i.e. there is no texture and no depth associated with them. A surface of the 3D object 10 is represented with a straight line 50 and the points 501 to 506 correspond to the points seen from the point of view 52. The squares associates with the points 501 to 506 are illustrated with a shade of grey. When projecting these points 501 to 506 on an associated depth image according to the point of view 52, one obtains a column of pixels associated with the points 501 to 506, one single pixel being associated with one single point.

Naturally, volume elements different from the square may be associated with the points of the 3D scene, e.g, a sphere. In the rest of the description, the expression "volume unit" will be used to express the volume element associated with a point, a volume unit corresponding for example a voxel of size 1 by 1 by 1, e.g. 1 mm by 1 mm by 1 mm (with a volume of 1 mm$^3$), or 1 cm by 1 cm by 1 cm (with a volume of 1 cm$^3$) or any other dimensions.

FIG. 5B illustrates a 2D representation 5B of the same part of the 3D object 10 as the one illustrated on FIG. 5A, the 2D representation 5B being obtained by deprojecting the points 501 to 506 from the depth image obtained from the 2D representation 5A according to the point of view 52. The points (and associated volume units) 501 to 506 are shown with a shade of grey. Points (and associated volume units) 511 to 518 are shown with a pattern of diagonal stripes and correspond to the holes of the 3D object 10 when seen from the point of view 53. These holes may result from the reconstruction of the 3D object using the depth image obtained when projecting the points according to the point of view 52 that is different from the point of view 53, such holes leading to visible artefacts when looking at the reconstructed 3D object from the point of view 53. No texture information and no depth information is associated with the points 511 to 518 corresponding to the holes.

Figure 6B:
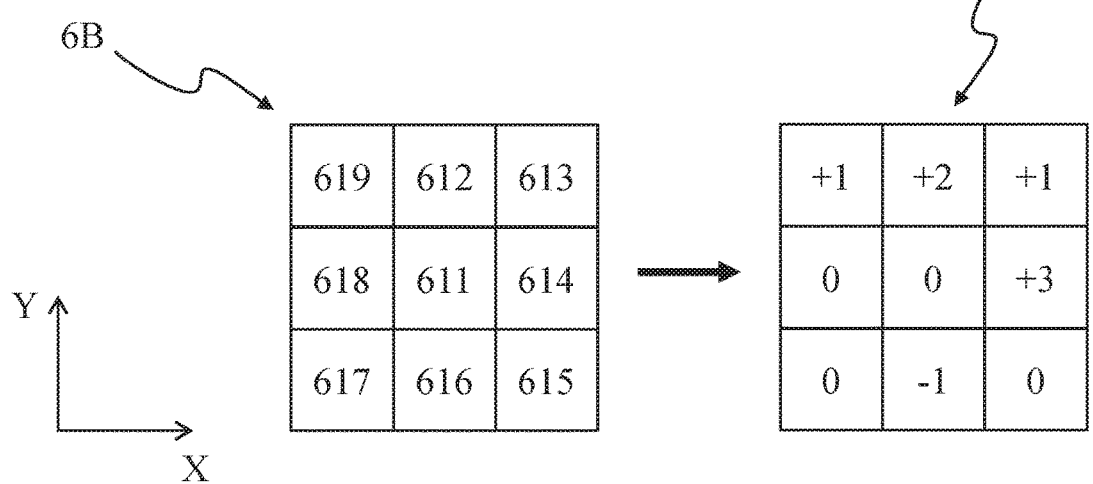

FIG. 6A shows a subset 6A of points of the 3D object of FIG. 1 in three dimensions and FIG. 6B shows the part 6B of the depth image associated with the subset 6A, according to a non-limiting example of the present principles.

FIG. 6A shows the subset 6A of points of the 3D object and associated volume units 601, 602, 603, 604, 605, 606, 607, 608, and 609, illustrated with cubes or voxels on FIG. 6A. Cubes 601 to 609 extends onto three dimensions X, Y and Z, the axis Z representing the depth while X represents the abscissa axis and Y the ordinate axis. The arrows 61, 62 and 63 represent different points of view according to which the subset 6A may be seen. The point of view 61 enables to see the subset 6A according to the Z axis; the point of view 62 enables to see the subset 6A according to the Y axis; and the point of view 63 enables to see the subset 6A according to the X axis. The cubes 602 to 609 (or equivalently the points 602 to 609) may be seen as forming a neighborhood of the cube 601 (or equivalently the point 601).

FIG. 6B shows the part 6B of the depth image associated with the subset 6A. The part 6B of the depth image may be obtained by projecting the cubes (points) 601 to 609 according to the point of view 61 and associated axis Z. As can be seen on FIG. 6B, the part 6B forms a block of 9 pixels, 8 adjacent pixels 612 to 619 (that each corresponds/refers to the associated cubes/points 602 to 609, respectively, of the subset 6A) surrounding the pixel 611 (that corresponds/refers to the associated cube/point 601 of the subset 6A). The cubes/points 602 to 609 correspond to the neighborhood of the cube/point 601 as their corresponding pixels 612 to 619 of the associated depth image correspond to the adjacent pixels of the depth image surrounding the pixel 611 corresponding to the cube/point 601.

When viewed from the point of view 61, no hole appears in the subset 6A (the view according to the point of view 61 corresponds to the part 6B of the depth image). But when viewed from other points of view, hole(s) may appear. For example, when viewed from the point of view 62, a hole appears between the cubes/points 601 and 602, the space occupied by such a hole corresponding to the space of a cube 6001 shown with stripes. Such a hole 6001 is illustrated on FIG. 7A. FIG. 7A illustrates a part of the view of the subset 6A from the point of view 62, specifically the part comprising the cubes 601 and 602 and the free space between them, i.e. the space not occupied by a cube/point of the subset 6A. When viewed from the point of view 63, a hole appears between the cubes/points 601 and 604, the space occupied by such a hole corresponding to the space of two cubes shown with stripes, i.e. the cubes 6001 and 6002. Such a hole 6001, 6002 is illustrated on FIG. 7B, FIG. 7B illustrating a part of the view of the subset 6A from the point of view 63, specifically the part comprising the cubes 601 and 604 and the free space between them, i.e. the space not occupied by a cube/point of the subset 6A.

The depth image associated with the 3D scene may be used to determine where hole(s) may be located in area(s) in the 3D scene. For example, the part 6B of the depth image associated with (and obtained from) the part 6A of the points of the 3D object 10 is processed and analysed as explained hereinbelow to obtain the location of the hole(s). More specifically, the depth information associated with the pixels 611 to 619 is used to obtain the location of the hole(s) 6001, 6002. The block 6C of FIG. 6B shows the depth information which is associated with the pixels 611 to 619. Such a process is for example applied to a current pixel, namely the current pixel 611 (that is associated with the current point 601) in the example of FIGS. 6A and 6B. In the example of FIG. 6B, a reference depth is associated with the current pixel 611, for example a reference depth equal to 0. The depth associated with the pixels 612 to 619 adjacent to the current pixel 611 is expressed in volume unit (a volume unit corresponding to a cube/voxel in the example of FIGS. 6A, 6B). With regard to the current pixel, the depth associated with the adjacent pixel 612 is equal to +2 volume units; the depth associated with the adjacent pixel 613 is equal to +1 volume unit; the depth associated with the adjacent pixel 614 is equal to +3 volume units; the depth associated with the adjacent pixel 615 is equal to 0 volume unit; the depth associated with the adjacent pixel 616 is equal to −1 volume unit; the depth associated with the adjacent pixel 617 is equal to 0 volume unit; the depth associated with the adjacent pixel 618 is equal to 0 volume unit; and the depth associated with the adjacent pixel 619 is equal to +1 volume unit. Naturally, the depth associated with the pixels may be expressed in any other metric, for example with the number of volume units separating the points (i.e. the associated cubes) from the points of view associated with the depth image, i.e. the distance between the point of view and the points of the 3D scene (e.g. the depth associated with the current pixel 611 may be equal to 1254 volume units, the depth associated with the adjacent pixels 612 to 619 would then be 1256, 1255, 1257, 1254, 1253, 1254, 1254 and 1255, respectively). According to another example, the depth may be expressed in centimetre or meter or in any other metric, corresponding to the distance expressed in centimetre or meter from the point of view associated with the depth image.

Depth information associated with each adjacent pixel 612 to 619 is compared with the depth information associated with the current pixel 611. For example, the depth difference is computed between each adjacent pixel 612 to 619 and the current pixel 611. When the difference is greater than or equal to a first determined value (e.g. 2 volume units when the depth is expressed in number of volume units), it means that the cubes associated with the considered adjacent pixel and with the current pixel are not adjacent in the space of the 3D scene, meaning that they do not contact each other in the 3D scene, which means that there is a hole between them. For example, the depth difference between the pixels 612 and 611 is equal to +2, which means that there is a hole between the corresponding cubes 601 and 602 in the 3D scene, as it clearly appears on FIG. 6A (the hole corresponding to the empty space illustrated with the cube 6001). The depth difference between the pixels 614 and 611 is equal to +3, which means that there is a hole between the corresponding cubes 601 and 604 in the 3D scene, as it clearly appears on FIG. 6A (the hole corresponding to the empty space illustrated with the cubes 6001 and 6002). According to another example, the depth difference between the pixels 617 and 611 is equal to +0, which means that there is no hole between the corresponding cubes 607 and 601 in the 3D scene, as it clearly appears on FIG. 6A (the cubes 607 and 601 contacts each other as they both belong to the plane defined by the axis X and Y; they share a face). According to another example, the depth difference between the pixels 619 and 611 is equal to +1, which means that there is no hole between the corresponding cubes 609 and 601 in the 3D scene, as it clearly appears on FIG. 6A (the cubes 609 and 601 contacts each other as they share a corner).

The same processing may be performed for each point of the 3D scene (or at least for each point of a part of the points of the 3D scene, for example for each point every two points, or each point every to 8 eight points), i.e. each point may be processed as a current point and its depth compared with the depth of its neighborhood (i.e. in the space of the associated depth image).

According to a variant, only the positive depth differences are considered and compared with the first determined value. A negative depth difference would be considered by taking the adjacent pixel having a negative depth difference as a new or other current pixel. By considering only the positive depth differences, processing of the 3D scene to detect the hole(s) is speeded up.

According to another variant, the depth difference between two adjacent pixels is also compared with a second determined value and only the depth differences that are less than or equal to this second determined value may be considered to determine whether there is a hole between the cubes associated with the adjacent pixels. The comparison with the second determined value enable to ensure that the two cubes belong to a same object of the 3D scene or to a same part of the 3D object. Indeed, if the depth difference between two adjacent pixels (i.e. between the two corresponding cubes) is too big, it means that these two cubes do not belong to a same surface. The second determined value may for example be equal to 10, 50, or 100 volume units. A hole between two cubes is determined when the following conditions are fulfilled:

$$Th1 \le d \le Th2 \qquad \text{Equation 1}$$

with d corresponding to the depth difference between the two considered pixels (and associated cubes); Th1 corresponding to the first determined value; and Th2 corresponding to the second determined value.

To fill the determined hole(s), additional cubes/points may be generated between two cubes/points having a depth difference d (in the depth image) fulfilling the equation 1. The additional cubes/points may be generating by computing their associated depth and texture from the depth and texture associated with the cubes used to determine the hole (e.g. by interpolation of the points/cubes used to determine the presence of a hole). The number of generated additional points may be a function of the depth difference, for example equals to d minus 1 (d−1), when the depth difference is expressed with a number of volume units. For example, the number of points/cubes generated between the points/cubes 601 and 602 is equal to 1, the depth difference between the corresponding pixels 611 and 612 of the depth image being equal to 2. According to another example, the number of points/cubes generated between the points/cubes 601 and 604 is equal to 2, the depth difference between the corresponding pixels 611 and 614 of the depth image being equal to 3.

The additional point/cube 6001 generated between the existing points/cubes 601 and 602 may receive as texture information the mean value of the texture values associated with the points/cubes 601 and 602 and as depth information the mean value of the depth value associated with the points/cubes 601 plus 1 ($d_{601}+1$).

The additional points/cubes 6001 and 6002 generated between the existing points/cubes 601 and 604 may receive as texture information the mean value of the texture values associated with the points/cubes 601 and 604 and as depth information the depth value of the point 601 plus 1 for the cube 6001 ($d_{601}+1$) and the depth value of the point 601 plus 2 ($d_{601}+2$) for the cube 6002.

According to a variant, a weight is associated with the texture of the existing points/cubes to determine the texture of an additional point/cube. For example, a greater weight may be associated with the texture of the point 601 than with the weight of the point 604 when computing the texture of the additional point 6001, as the additional point 6001 is closer to the point 601 than to the point 604. In contrast, a greater weight may be associated with the texture of the point 604 than with the weight of the point 601 when computing the texture of the additional point 6002, as the additional point 6002 is closer to the point 604 than to the point 601. For example, the weight associated with a texture value when interpolating a texture value to be associated with a generated additional point may be inversely proportional to the distance (depth) separating the generating additional point from the point used to generate it. For example, when computing the texture of the additional point 6001, a weight equal to 2 may be associated with the texture of the point 601 and a weight equal to 1 may be associated with the texture of the point 604, the distance (depth difference) between the additional point 6001 and the point 601 being equal to 1 volume unit while the distance (depth difference) between the additional point 6001 and the point 604 being equal to 2 volume units.

According to another variant the texture information to be associated with a generated additional point corresponds to the texture information of one of the point used to generate it. For example, the texture information of the point 601 may be applied to the generated additional point 6001 and the texture information of the point 604 may be applied to the generated additional point 6002.

According to a further optional variant, instead of generating additional point(s) each time a depth difference d (between a current pixel and a pixel adjacent to this current pixel) is determined greater than or equal to the first determined value Th1 and less than or equal to the second determined value Th2, additional points are generated only between the current pixel and the pixel adjacent pixel having the greatest depth difference $d_{max}$ within the interval [Th1; Th2]. For example, instead of generating twice the point/cube 6001 (one time using the points/cubes 601 and 602 and one time using the points/cubes 601 and 604), the point cube 6001 is generated only once using the points/cubes 601 and 604 as the depth difference (i.e. +3) between the points 601 and 604 is greater than the depth difference (i.e. +2) between the points 601 and 602. To reach that aim, the greatest depth difference $d_{max}$ (that is less or equal to Th2) is selected among all depth differences $d_{612}$ to $d_{619}$ of the block of pixels 6B and only the adjacent pixel 614 corresponding to the greatest depth difference $d_{max}$ among all adjacent pixel 612 to 619 is considered with the current pixel 611 to generated additional points/cubes (from the corresponding points/cubes 601 and 604).

FIG. 8 shows a method of generating one or more points of a 3D scene implemented for example in a device 9 (described with regard to FIG. 9), according to a non-restrictive embodiment of the present principles.

In a first operation 81, the depth information associated with a current pixel is compared with the depth information associated with pixels spatially adjacent to the current pixel in a depth image. The depth image is associated with existing points of a 3D scene or part of the 3D scene (e.g. existing points of a 3D object). Each pixel of the depth image is associated with a corresponding point of the 3D scene, the depth image being obtained by projecting the points of the 3D scene on corresponding pixels, the depth attributes of the points being stored in the depth image and associated with the corresponding pixels.

In a second operation 82, one or more additional points of the 3D scene are generated, in addition to the current point that is associated with the current pixel. The current point is for example generated by deprojecting the current pixel, using the parameters of the projection used to obtain the depth image from the existing points of the 3D scene. The one or more points are generated for example by using the current point and a point of the 3D scene obtained by deprojecting a pixel of the depth image adjacent to the current pixel, when the depth difference between the current pixel and the adjacent pixel is greater than a first value Th1 and lower than a second value Th2. Additional points may for example be generated for each pair of points (each pair including the current point and a point of the neighborhood of the current point corresponding to a pixel of the depth image adjacent to the current pixel) having a depth difference comprised between the first value and the second value. The number of additional points that are generated depend from the depth difference, the greater the depth difference, the greater the number of generated additional points.

According to a variant, the adjacent pixel having the greatest depth difference with the current pixel is selected among the adjacent pixels having a depth difference with the current pixel comprised between the first value and the second value, and the additional points are generated using only the current point and the neighbour point corresponding to said adjacent pixel having the greatest depth difference.

The attributes to be associated with the additional points, especially the texture attributes, are determined using the attributes of the current points and of the neighbour points (respectively corresponding to the current pixel and the adjacent pixel) used for generating the additional points. The texture attributes are for example obtained by interpolating the texture attributes of the current point and of the neighbour point.

The first and second operations may be reiterated for a plurality of current pixels (or equivalently corresponding current points of the 3D scene), for example for each pixel of the depth image, or for each pixel of a part of the pixels of the depth image.

FIG. 9 shows an example of an architecture of an apparatus 9 adapted to implement at least one of the methods described with regard to FIGS. 6 and 8, in accordance with a non-limiting embodiment of the present principles.

The apparatus 9 comprises following elements that are linked together by a data and address bus 91:
- a microprocessor 92 (or CPU), which is, for example, a DSP (or Digital Signal Processor);
- a ROM (or Read Only Memory) 93;
- a RAM (or Random-Access Memory) 94;
- a storage interface 95;
- an I/O interface 96 for reception of data to transmit, from an application; and
- a power supply, e.g. a battery.

In accordance with an example, the power supply is external to the device. In each of mentioned memory, the word «register» used in the specification can correspond to area of small capacity (some bits) or to very large area (e.g. a whole program or large amount of received or decoded data). The ROM 93 comprises at least a program and parameters. The ROM 93 may store algorithms and instructions to perform techniques in accordance with present principles. When switched on, the CPU 92 uploads the program in the RAM and executes the corresponding instructions.

The RAM 94 comprises, in a register, the program executed by the CPU 92 and uploaded after switching on of the apparatus 9, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

The points of the 3D scene (e.g. points of a point cloud) and associated data/attributes (e.g. depth and texture of the points) are obtained from a source. For example, the source belongs to a set comprising:
- a local memory (93 or 94), e.g. a video memory or a RAM (or Random-Access Memory), a flash memory, a ROM (or Read Only Memory), a hard disk;
- a storage interface (95), e.g. an interface with a mass storage, a RAM, a flash memory, a ROM, an optical disc or a magnetic support;
- a communication interface (96), e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

In accordance with examples of the decoding/rendering or decoder(s)/renderer(s), the decoded points or the reconstructed 3D scene is sent to a destination; specifically, the destination belongs to a set comprising:
- a local memory (93 or 94), e.g. a video memory or a RAM, a flash memory, a hard disk;
- a storage interface (95), e.g. an interface with a mass storage, a RAM, a flash memory, a ROM, an optical disc or a magnetic support; and
- a communication interface (96), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples, the apparatus 9 is configured to implement a method described in relation with at least one of the FIGS. 6 to 8, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).
- a set top box;
- a TV set; and
- a display (such as a HMD for example).

FIG. 10 shows schematically a diagram of an encoding/decoding scheme of a 3D scene, e.g. a point cloud 103, according to a particular and non-limiting embodiment of the present principles.

The point cloud 103 is encoded into encoded data under the form of a bitstream 104 via an encoding process 101 implemented in a module M101. The bitstream is transmitted to a module M102 that implements a decoding process 102 to decode the encoded data to obtain a decoded point cloud 105. The modules M101 and M102 may be hardware, software or a combination of hardware and software.

The point cloud 103 corresponds to a large collection of points representing an object, for instance the external surface or the external shape of the object. A point cloud may be seen as a vector-based structure, wherein each point has its coordinates (e.g. three-dimensional coordinates XYZ, or a depth/distance from a given point of view) and one or more components. An example of component is the color component that may be expressed in different color spaces, for example RGB (Red, Green and Blue) or YUV (Y being the luma component and UV two chrominance components). The point cloud may be a representation of the object as seen from one or more points of view. The point cloud may be obtained of different ways, e.g.;
- from a capture of a real object shot by one or more cameras, optionally complemented by depth active sensing device;
- from a capture of a virtual/synthetic object shot by one or more virtual cameras in a modelling tool
- from a mix of both real and virtual objects.

The point cloud 103 may be a dynamic point cloud that evolves with the time, i.e, the number of points may vary with the time and/or the location (e.g. at least one of the coordinates X, Y and Z) of one or more points may vary with the time. The evolution of the point cloud may correspond to the motion of the object represented by the point cloud and/or to any change of shape of the object or part(s) of the object.

The point cloud 103 may be represented in a picture or in one or more groups of temporally successive pictures, each picture comprising a representation of the point cloud at a determined time 't'. The one or more groups of temporally successive pictures may form a video representative of at least a part of the point cloud 103.

The encoding process 101 may for example implement intra-picture coding and/or inter-picture coding. Intra-picture coding is based on intra-picture prediction that exploits spatial redundancy, i.e, correlation among pixels within one picture, by calculating prediction values through extrapolation from already coded pixels for effective delta coding. Inter-picture coding is based on inter-picture prediction that exploits temporal redundancy. Temporally independently coded so-called intra pictures 'I' use only intra coding. The temporally coded predicted pictures 'P' (or 'B') may use intra- and inter-picture prediction.

The decoding process 102 may for example correspond to the inverse operations of the encoding process 101 to decode the data encoded with the encoding process.

FIG. 11 shows an example of the syntax of a signal transmitted for example between two remote devices, when the data are transmitted over a packet-based transmission protocol. Each transmitted packet P comprises a header H and payload data PAYLOAD.

According to embodiments, the payload PAYLOAD may comprise at least one of the following elements:
- bits that represent at least one picture representing the point cloud at a determined time t, e.g. the bits may represent texture information and/or depth information associated with the pixels of the at least one picture;

bits that represent projection information data and the mapping between the projections and the images of the at least one picture.

FIG. 12 shows operations for encoding the 3D scene, e.g. the point cloud 103, according to a particular and non-limiting embodiment of the present principles. The operations may be part of the encoding process 101 and may be implemented by the apparatus 9 of FIG. 9.

In an operation 120, data of a picture 20 of the point cloud is encoded by an encoder ENC1. The picture 20 is for example part of a group of pictures (GOP) and comprises data representative of the point cloud at a determined time 't'. The picture 20 may comprise a set of images, at least one of the images of the set comprising attributes that correspond to at least a part of the data of the picture 20. The attributes may be obtained by projecting, according to a determined projection, a part of the point cloud in each image, the attributes corresponding to the attributes of the points of the part of the point cloud projected onto said each image. The attributes may correspond to texture (or color) information and/or depth (or distance to a view point) information. The encoder ENC1 is for example compliant with a legacy encoder such as:

JPEG, specification ISO/CEI 10918-1 UIT-T Recommendation T.81, https://www.itu.int/rec/T-REC-T.81/en, AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en), or 3D-HEVC (an extension of HEVC whose specification is found at the ITU website, T recommendation, H series, h265, http://www.itu.int/rec/T-REC-H.265-201612-I/en annex G and I).

The encoded data of the picture 20 may be stored and/or transmitted in the bitstream 104.

In an operation 121, the encoded data of the picture 20 is decoded by a decoder DEC1. The decoder DEC1 is compliant with the encoder ENC1, for example compliant with a legacy decoder such as:

JPEG,

AVC, also named MPEG-4 AVC or h264,

HEVC, or

3D-HEVC (an extension of HEVC).

The attributes, encoded at operation 120, are decoded and retrieved, at operation 121, for example stored in a buffer memory, for use in the generation of a reference picture 125 associated with the picture 20.

In an operation 122 implemented by a module M122, each image is processed as described with regard to FIG. 6 and/or 8 to generate points of the point cloud and for filling holes that may for example result from the encoding/decoding processes 120, 121.

A reference picture 125 may be obtained from the corrected image(s) obtained from the module M122.

The reference picture 125 may be used in an operation 124, implemented by a module M124. The operation 124 comprises for example the generation of predictors for inter prediction for the coding of one or more pictures of the point cloud, different from the picture 20 (e.g. pictures of the point cloud at determined times different from the time 't' of picture 20). The point cloud 103, or pictures representing the point cloud, may then be encoded by referring to the reference picture 125. According to a variant, the module M124 is part of the encoder ENC1.

Naturally, a plurality of reference pictures may be obtained in a same way as the reference picture 125, each reference picture of the plurality being obtained from a specific picture representing the point cloud, the encoding of the point cloud 103 referring to one or several reference pictures.

FIG. 13 shows operations for decoding the encoded version of the point cloud 103 from the bitstream 104, according to a particular and non-limiting embodiment of the present principles. The operations may be part of the decoding process 102 and may be implemented by the apparatus 9 of FIG. 9.

In an operation 131, encoded data of one or more pictures (e.g. pictures of one or more GOPs or of an intra period) of the point cloud is decoded by a decoder DEC2 from a received bitstream 104. The bitstream 104 comprises the encoded data of the one or more pictures. Each picture comprises a set of images, at least one of the images of the set comprising attributes that correspond to at least a part of the data of the picture that has been encoded. The attributes may be obtained by projecting, according to a first projection, a part of the point cloud in each first image, the attributes corresponding to the attributes of the points of the part of the point cloud projected onto said each first image. The attributes may correspond to texture (or color) information and/or depth (or distance to a view point) information. The decoder DEC2 may correspond to the decoder DEC1 of FIG. 12 and is for example compliant with a legacy decoder such as:

JPEG,

AVC, also named MPEG-4 AVC or H264,

HEVC, or

3D-HEVC (an extension of HEVC).

The attributes decoded at operation 131 are retrieved, for example stored in a buffer memory, for use in the generation of one or more reference pictures 135, each reference picture being associated with one picture. In the following, only one reference picture associated with one picture will be considered for clarity and conciseness purposes.

In an operation 132 implemented by a module M132 (that may be identical to the module M122 of FIG. 12), the decoded attributes are is processed as described with regard to FIG. 6 and/or 8 to generate points of the point cloud and for filling holes that may for example result from the encoding/decoding processes 120, 131.

A reference picture 135 (that may be identical to the reference picture 125 of FIG. 12) may be obtained from the picture by fusing the decoded first attributes obtained from the operation 121 with the second attributes obtained from the operation 123. The reference picture may comprise the same structure than the picture, i.e. the same spatial arrangement of the set of images but with different data, i.e. with the decoded first attributes and the obtained second attributes. A detailed description of an example of a process to obtain the reference picture is provided hereinabove with the description of FIG. 9.

The reference picture 135 may be used in an operation 134, implemented by a module M134. The operation 134 comprises for example the generation of the predictors for inter prediction from the decoding of the encoded data comprised in the bitstream. These data, associated to the generation of the predictor, may comprise a prediction type, for instance a flag indicating if the prediction mode is intra or inter, a motion vector, and/or an index to indicate a reference picture from a list of reference pictures.

Naturally, a plurality of reference pictures may be obtained in a same way as the reference picture 135, each reference picture of the plurality being obtained from decoded data of a specific picture representing the point cloud, the decoding of the data of the bitstream 104 may be based on one or several reference pictures to obtain a decoded point cloud 105.

Naturally, the present document is not limited to the embodiments previously described.

The present document is not limited to a method of generating point(s) of a 3D scene but also extends to a method for encoding and/or decoding a 3D scene/point cloud, and/or to a method and device for transmitting the bitstream obtained by the encoding of the 3D scene/point cloud and/or a method and device for receiving the bitstream obtained by the encoding of the 3D scene/point cloud. The present document also extends to a method and device for rendering and/or displaying the decoded 3D scene/point cloud, i.e. images of the 3D object represented by the decoded point cloud, a point of view being associated with each image.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a FDA, a HMD (Head-Mounted Display), smart glasses and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of generating points of a 3D scene from a depth image, the method comprising:

for a current pixel of the depth image, comparing depth information associated with the current pixel with depth information associated with pixels spatially adjacent to the current pixel in the depth image; and determining a difference of depth between the current pixel and an adjacent pixel, determining whether the difference of depth is less than a first value, the first value indicating whether the current pixel and the adjacent pixel belong to a same object of the 3D scene or a same part of an object of the 3D scene, and determining whether the difference of depth is greater than a second value, the second value indicating whether the difference of depth is positive, and, if the difference of depth is between the first value and the second value, generating at least one additional point of the 3D scene in addition to a current point associated with the current pixel of the depth image, wherein, a greater number of additional points is generated with a greater difference of depth.

2. The method of claim 1, further comprising selecting the adjacent pixel having the greatest depth difference with the current pixel among the adjacent pixels having a depth difference with the current pixel comprised between the first value and the second value, the number of generated additional points depending from the greatest depth difference.

3. The method of claim 1, wherein, a volume unit is associated with a point of the 3D scene, the depth difference corresponding to a number of volume units, and the number of generated points corresponds to the depth difference minus 1.

4. The method of claim 1, further comprising determining attributes to be associated with the at least one additional point, the attributes being determined from attributes associated with the current point and with the adjacent pixel.

5. The method of claim 4, wherein the attributes to be associated with the at least one additional point comprise depth information and/or texture information.

6. The method of claim 1, further comprising decoding the depth image from a received bitstream.

7. The method of claim 1, wherein the points of the 3D scene are part of a point cloud.

8. The method of claim 1, wherein the depth image is a 2D array.

9. A device configured to generate points of a 3D scene from a depth image, the device comprising:
a memory associated with at least one processor configured to:
for a current pixel of the depth image, compare depth information associated with the current pixel with depth information associated with pixels spatially adjacent to the current pixel in the depth image;
determine a difference of depth between the current pixel and an adjacent pixel, determine whether the difference of depth is less than a first value, the first value indicating whether the current pixel and adjacent pixel belong to a same object of the 3D scene or a same part of an object of the 3D scene, and determine whether the difference of depth is greater than a second value, the second value indicating whether the difference of depth is positive, and
if the difference of depth is between the first value and the second value, generate at least one additional point of the 3D scene in addition to a current point associated with the current pixel of the depth image, wherein, a greater number of additional points is generated with a greater difference of depth.

10. The device of claim 9, wherein the at least one processor is further configured to select the adjacent pixel having the greatest depth difference with the current pixel among the adjacent pixels having a depth difference with the current pixel comprised between the first value and the second value, the number of generated additional points depending from the greatest depth difference.

11. The device of claim 9, wherein, a volume unit is associated with a point of the 3D scene, the depth difference corresponding to a number of volume units, and the number of generated points corresponds to the depth difference minus 1.

12. The device of claim 9, wherein the at least one processor is further configured to determine attributes to be associated with the at least one additional point, the attributes being determined from attributes associated with the current point and with the adjacent pixel.

13. The device of claim 12, wherein the attributes to be associated with the at least one additional point comprise depth information and/or texture information.

14. The device of claim 9, wherein the at least one processor is further configured to decode the depth image from a received bitstream.

15. The device of claim 9, wherein the points of the 3D scene are part of a point cloud.

16. The device of claim 9, wherein the depth image is a 2D array.

17. A non-transitory processor readable medium having stored therein instructions for causing a processor to perform the method according to claim 1.

\* \* \* \* \*